3,292,780
PROCESS FOR IMPROVED FLOTATION TREATMENT OF IRON ORES BY SELECTIVE FLOCCULATION
Donald W. Frommer and Arthur F. Colombo, both of Bloomington, Minn., assignors to the United States of America as represented by the Secretary of the Interior
Filed May 4, 1964, Ser. No. 364,861
10 Claims. (Cl. 209—5)

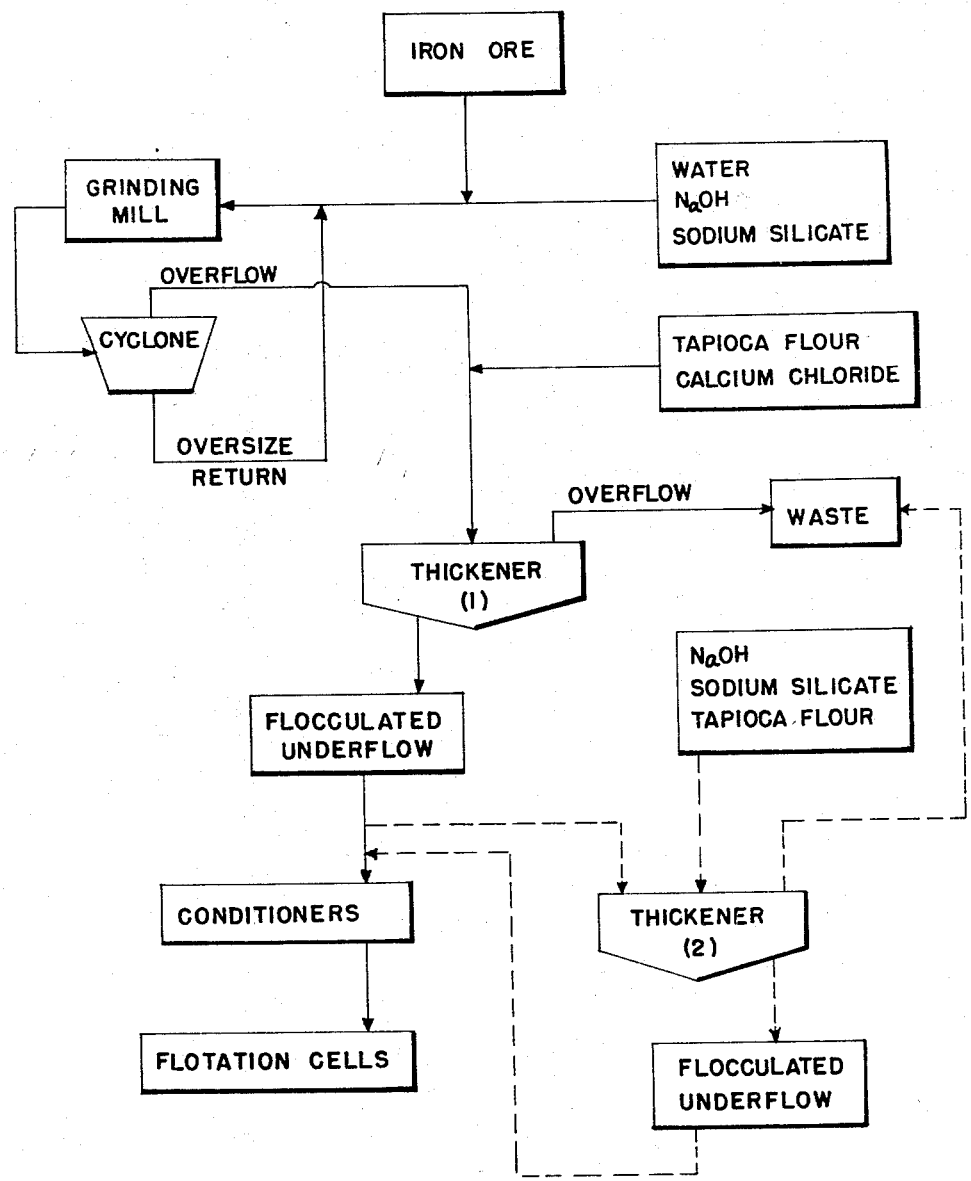

The invention herein described and claimed may be used by or for the Government of the United States of America for governmental purposes without the payment of royalties thereon or therefor.

This invention relates to concentration of iron ores for use in iron and steel making.

Reverse (silica) flotation processes, especially anionic flotation of silica, have been employed for production of high grade iron ore concentrates. These processes are frequently more effective than flotation of the iron minerals. Such processes, however, frequently require grinding of the ore to very fine sizes, resulting in reduction of some of the silica to slime that shows reluctant response to flotation. Utilization of conventional desliming processes to overcome this difficulty usually results in excessive iron losses.

It is therefore an object of the present invention to provide a method for removal of slimed silica to enable effective utilization of flotation processes on the deslimed residue.

It has now been found that this objective may be accomplished by dispersion of the finely ground ore, preferential flocculation of iron oxides and removal of slimed silica prior to treatment of the deslimed residues by conventional flotation methods.

The invention will be more specifically described with reference to the flow diagram of the figure. Water and dispersants (NaOH and sodium silicate), along with ore, are introduced to a grinding mill. The specific dispersants used, their concentration, pH, etc., are not critical and will vary with the particular ore, state of subdivision of the ore, etc. The function of these materials is simply to provide a uniform dispersion of the ore and the optimum conditions required can be readily determined by one skilled in the art.

It has however been found that a pH of from about 9.5 to about 11.0, provided by addition of about 1 to 3 pounds of NaOH per ton of ore, is generally preferred. Other alkaline materials such as KOH or $NH_4OH$ may be used to provide the desired pH. Dispersants such as sodium silicate, tannins, lignin sulfonates and alkaline phosphates have been found to provide a stable relatively nonsettling suspension. With sodium silicate the optimum quantity is generally from about 1 to about 3 lbs./ton of ore. Water is usually employed in an amount to provide a slurry containing about 50 to 80 percent solids during grinding.

The discharge from the grinding mill is diluted to 2.5 to 25 percent solids and passed to a cyclone or other classification device, with oversize being returned to the grinding mill. Finished-size feed is then removed by overflow and admixed with flocculating materials (tapioca flour and calcium chloride in figure). Any flocculating materials that cause a selective flocculation of the iron oxide in preference to the silica materials may be used; examples are tapioca flour, potato starch or other flours, natural and modified starches, or polyacrylamides having flocculating properties. Addition of calcium chloride has also been found effective in increasing the settling rates and controlling the amount of suspensoid.

The ore pulp suspension admixed with flocculants is then passed to a thickener where settling and decantation of slimes is effected. In practice the pulp flowing to the thickener will usually contain from about 2.5 to 25 percent solids comprising up to about 2 pounds of calcium chloride per ton and up to about 2 pounds of flocculants per ton. The action of these chemicals is to produce a rapidly settling flocculated zone comprised chiefly of iron oxide particles while retaining a suspension comprising chiefly slimed silica or silicate particles.

The suspension of silica and silicates is then removed to waste by overflowing. However, other methods such as siphoning or decantation may be used for removal of the suspension. The flocculated solids (underflow) are removed from the thickener and transported to conditioners for conditioning preliminary to flotation. Alternatively, the flocculated solids may be transferred to a second thickener for treatment with additional dispersants and flocculants and the selective flocculation and desliming process repeated in this second thickener. The flocculated underflow from this second desliming process is transferred to the conditioners while the overflow is transferred to waste.

Following separation of the flocculated underflow from the thickener, suitable conditioning agents are added in the conditioners from which the conditioned pulp is passed to the flotation unit. Addition of conditioning agents directly to the flotation unit rather than to a separate conditioning unit may be advantageous in some cases.

The flotation operation in the method of the present invention is conventional in beneficiation of iron ores. Such processes are described in Bureau of Mines Report of Investigations No. 3799, March 1945, as well as in U.S. Patents 2,364,777 and 2,364,778. In the method of the present invention flotation of the silica (rather than flotation of the iron minerals) is preferred. Either anionic or cationic flotation collectors may be employed, although the anionic reagents generally give best results. However, as stated previously, beneficiation of iron ores by flotation of silica has previously met with very limited success, particularly where fine grinding of the ore is necessary prior to flotation. Removal of a large percentage of the thus formed silica slimes by the selective flocculation step of the invention enables a much more satisfactory concentration of iron minerals from ores by the subsequent flotation process.

The following examples will serve to more particularly describe the process of the invention.

EXAMPLE 1

This example illustrates the combination of selective flocculation and anionic flotation of calcium activated silica from a fine grained, siliceous iron ore. The ore is wet ground at 50 percent solids to 95 percent passing 400-mesh with 2.0 lbs. NaOH/ton and 3.0 lbs. sodium silicate/ton. The NaOH is added to give a pH of about 10 to 11.0 in the ground and diluted pulp. The sodium silicate used is water glass (8.9 percent $Na_2O$ and 29 percent $SiO_2$) and serves to give a dispersed pulp.

The ground pulp is then diluted to 17 percent solids and the iron oxide selectively flocculated by addition of 0.25 lb. $CaCl_2 \cdot 2\ H_2O$/ton and 0.5 lb. tapioca flour/ton. The tapioca flour functions as the flocculant while the calcium chloride serves to accelerate formation and settling of the floccules. The flocculated pulp is then deslimed by removal of suspended silica by siphoning. Analysis of resulting slimes is as follows:

| | |
|---|---|
| Weight percent | 22.2 |
| Distribution, percent Fe | 3.8 |
| Grade, percent Fe | 6.2 |

The deslimed pulp containing selectively flocculated iron oxides is prepared for flotation by dilution to about 30 percent solids. The pulp is then conditioned for about 2 minutes with 1.0 lb. tapioca flour/ton which serves as an iron oxide depressant. NaOH is added in an amount of 2.0 lbs./ton of ore to adjust the pH of the pulp to about 11.5. 0.25 pound of calcium chloride per ton of ore and 1.0 pound tall oil per ton of ore are then added as activator and collector, respectively, for the silica.

The conditioned pulp is then diluted to about 25 percent solids and routed to a flotation cell for aeration and froth removal. By this procedure silica is floated, iron oxides being depressed; the cell underflow is therefore the desired concentrate of iron oxides. This concentrate shows the following analysis:

| | |
|---|---|
| Weight percent | 33.7 |
| Distribution, percent Fe | 62.0 |
| Grade, percent Fe | 65.6 |
| Percent $SiO_2$ | 3.4 |

Cleaning of the froth from the flotation step is then accomplished by twice recycling through the flotation step without additional reagents. Analysis of the composite middling resulting from recycling is as follows:

| | |
|---|---|
| Weight percent | 16.7 |
| Distribution, percent Fe | 26.9 |
| Grade, percent Fe | 57.6 |

Analysis of the tailing (final froth product) is as follows:

| | |
|---|---|
| Weight percent | 27.4 |
| Distribution, percent Fe | 7.3 |
| Grade, percent Fe | 9.5 |

Amounts and types of reagents employed in the flotation steps may vary considerably, optimum conditions being best determined experimentally in view of the highly empirical nature of the flotation art. Amounts of sodium silicate will usually vary from about 1.0 to about 3.0 or more lbs./ton of ore. Other dispersants such as lignin sulfonate may be used in place of or in addition to the sodium silicate.

Dilutions other than that of the above example may be used in the flocculation step; more dilute pulps usually require more NaOH and sodium silicate. Pulp densities generally range from about 1 to about 25 percent solids.

Flocculating reagents may also vary. Some ores do not require calcium chloride while others may require up to 2.0 lbs./ton or more. Amounts of tapioca flour will usually range from about 0.25 to about 2.0 lbs./ton. Other flocculants such as potato starch could also be used.

Concentration of pulp solids during conditioning may vary from about 10 to about 65 percent, though about 30 percent is generally used. Amounts of tapioca flour will depend on usage during selective flocculation and on requirements of the particular ore but generally range from about 0.5 to 2.0 lbs./ton. Other depressants may also be used such as starches, starch derivatives and lignin sulfonates. Conditioning time is usually about one or two minutes.

Adjustment of the pulp to optimum pH value is usually important for effective flotation. A value of about 11.5 to 12.0 has generally been found to give best results. NaOH is preferred for control of alkalinity although other bases may be used. Usually about 2.0 to 3.0 lbs. of NaOH/ton is required to give the proper pH value. Conditioning period is usually about 1 or 2 minutes.

Optimum amounts of calcium chloride will also vary with the type of ore; however, amounts of from zero to about 3.0 lbs./ton are generally employed. Calcium chloride furnishes calcium ion that activates silica surfaces for flotation with fatty acids. The conditioning period with calcium salt is usually about 1 or 2 minutes. In some instances it may be desirable to add calcium as the last reagent in the sequence, following addition of the fatty acid.

The fatty acid used in the above example was a tall oil containing nearly equal amounts of oleic and linoleic acids. Other pure fractions or mixtures of 18-carbon, unsaturated fatty acids of animal or vegetable origin could be used with varying degrees of effectiveness. Fatty acids of other chain lengths may also be satisfactory for some ores. Amounts of fatty acid up to about 3 lbs./ton of ore are generally satisfactory. Fatty acid soaps, such as sodium soaps, may also be used as collector in place of the fatty acids. Conditioning time with the fatty acid will vary upwards to as much as 15 minutes with about 3 minutes usually being adequate.

In the method of the example a frother is generally not necessary, although about 0.1 lb. of pine oil/ton may be used in some instances.

EXAMPLE 2

This example illustrates the combination of selective flocculation and cationic flotation of silica from a fine grained, siliceous iron ore. In the example, stage additions of cationic collectors are employed for greater effectiveness; a single addition of collector may also be employed.

The ore is wet ground at 50 percent solids to 95 percent passing 400-mesh, with 1.0 lb. NaOH/ton and 1 lb. sodium silicate/ton and then diluted to 17 percent solids.

The iron oxides are selectively flocculated by 0.75 lb. tapioca flour per ton of ore without the use of calcium chloride. Suspended silica (slimes) is removed from the flocculated pulp by overflowing. Analysis of the slimes is as follows:

| | |
|---|---|
| Weight percent | 20.0 |
| Distribution, percent of Fe | 5.5 |
| Grade, percent of Fe | 10.0 |

The deslimed pulp is diluted to about 30 percent solids and is then conditioned for 1 minute with 0.1 lb. of Arquad C/ton, 0.12 lb. kerosene containing 10 percent silicone/ton and 0.06 lb. pine oil/ton. The Arquad C, an alkyl quaternary ammonium chloride—a mixture of 8 to 18 carbon chain amines, is a weak silica collector; cyclic tertiary amines (imidazolines) have also been used at this stage.

In this example prior conditioning with tapioca flour to depress iron is not employed, residual tapioca from the selective flocculation step serving this purpose. Prior conditioning with tapioca flour may however be desirable with certain ores.

Pulp pH is that obtained upon dilution—about 9.5. The kerosene-silicone mixture serves to modify the froth structure and the pine oil is added for frothing properties.

A first rougher flotation is accomplished by diluting the pulp to 25 percent solids, aerating and froth removal. Depressed iron is contained in the cell underflow while the froth contains silica. Following this rougher flotation the pulp is conditioned 2 minutes with 0.75 lb. of tapioca flour/ton (for suppression of iron oxides) and for an additional 1 minute with 0.15 lb. Armac 12D/ton.

Armac 12D, a 12-carbon aliphatic amine-acetate, is a stronger collector than Arquad C but more expensive than the latter. Its purpose is to collect the more difficultly floatable course quartz and silicates. Other primary and secondary aliphatic amines, as pure fractions or mixtures having 8 to 22 carbon atom chains may be used with varying degrees of effectiveness. Amines are customarily neutralized before flotation by reacting with hydrochloric or acetic acid, thereby increasing water solubility. Generally amounts greater than about 0.5 lb./ton are not used because of reagent costs.

A second stage rougher flotation is then accomplished by aerating and froth removal, the cell underflow again constituting the flotation concentrate. Analysis of the concentrate is as follows:

Weight percent _____ 35.2
Distribution, percent Fe _____ 64.2
Grade, percent Fe _____ 66.8
Percent SiO₂ _____ 4.0

A cleaner flotation step is then carried out in which froths from first and second rougher stages are combined for cleaning by recycling through the flotation step without additional reagents. The froths are subjected to two cleaning operations to give a composite middling having the following analysis:

Weight percent _____ 19.1
Distribution, percent Fe _____ 23.6
Grade, percent Fe _____ 45.3

Analysis of the final broth, i.e., tailings is as follows:

Weight percent _____ 25.7
Distribution, percent Fe _____ 6.7
Grade, percent Fe _____ 9.6

As in the case of processes employing anionic collectors (Example 1), specific types and amounts of reagents using cationic collectors may vary widely and are best determined empirically.

EXAMPLES 3–13

Table 1 gives reactants and results of laboratory bench-scale experiments that further illustrate the variety of possible applications of the process of the invention and the advantages derived therefrom. A description of ores A, B and C employed in these examples is given in table 2, below.

Examples 3, 4 and 5 pertaining to ore A ground to 100 percent passing 325-mesh, show the following: Example 3, desliming following dispersion of slime with sodium hydroxide and sodium silicate, resulted in slime products totaling 62.7 percent of total weight, with slime products of equal or higher iron analysis than the composite head (original ore). Example 4 lists metallurgical results obtained on ore sample A, by flotation without desliming. Example 5 gives the metallurgical results obtained by flotation after dispersion, selective flocculation, and triple decantation of slimes. Note improved concentrate grade, and higher distribution value of Fe in concentrate as compared to Example 4. In comparing Examples 3 and 5, note that slime products of Example 5 contain 6.1 percent Fe in highest grade product, whereas slime of Example 3 ranged from 36.9 to 40.6 percent Fe. Flotation tests described in Examples 4 and 5 employed anionic methods for flotation of silica. Example 11, also on ore A, describes a flotation test made after selective flocculation and desliming, but differs from Example 5, in that cationic reagent (Armac C) was used as silica collector instead of fatty acid.

Examples 6, 7, 8, 9 and 10 describe tests on iron ore B. Example 6 shows results of simple dispersion and desliming practiced on material ground so that 88 percent passes 400-mesh sieve. Only slime #1 is of significant weight, and contained 28.2 percent Fe. Example 7 lists anionic flotation results obtained on ore B, without desliming of any type. Example 8, illustrates the practice of flotation after selective flocculation and desliming. While concentrate grade shown under Example 8 is not improved significantly, improvements were obtained in recovery (distribution) of iron in concentrate. The slime product in Example 8 is of reduced weight and iron content from slime product #1, Example 6; reduction in iron content and weight is attributed to practice of selective flocculation. Examples 9 and 10 show the practice of selective flocculation and flotation where potato starch was substituted in part for tapioca flour as the flocculant, and (Example 10) where Marasperse (lignin sulfonate) was substituted for sodium silicate.

Example of practice of the invention on a third ore is given in Examples 1, 12 and 13. Example 12 illustrates the practice of desliming alone, in the presence of dispersants, and shows a high weight of slime product containing 22.5 percent Fe and contributing to loss of 26.4 percent of the iron units. Example 13 illustrates laboratory flotation without either desliming or selective flocculation and desliming; note that the concentrate contains 64.2 percent Fe, 4.6 percent SiO₂ and recovers 52.1 percent of iron in the sample. Data given in Example 1, above, shows, when compared to Example 12, a reduced iron content and loss in slime product due to practice of selective flocculation. Comparisons between concentrates, Examples 1 and 13, show an improved grade, and almost 10 percent greater Fe recovery (distribution) as a result of prior selective flocculation.

Tests were also run in the pilot plant on a continuous basis, using ore C, which confirmed laboratory results, in proving that beneficial effects are obtained from selective flocculation and desliming ahead of flotation. Because the pilot plant tests were not made with the specific purpose of proving the process, results are not directly comparable to those obtained in the laboratory. However, data obtained showed that selective flocculation and desliming will work under dynamic conditions (continuous pilot plant), and is not confined to static conditions that prevail in batch laboratory testing.

Results of these continuous circuit flotation operations are shown in Table 3 (without selective flocculation) and in Table 4 (with selective flocculation).

TABLE 1

| Ex. | Ore | Product | Wt.-percent | Analysis, percent | | Distribution percent Fe | Type | Reagents, Amount, lb./T. | | | Grind |
| | | | | Fe | SiO₂ | | | Desliming | Selective Flocculation and Desliming | Flotation | |
| --- | --- | --- | --- | --- | --- | --- | --- | --- | --- | --- | --- |
| 3 | A | Deslimed Sand | 37.3 | 50.4 | 27.6 | 51.2 | NaOH | 2.0 | | | −325 mesh. |
| | | Slimes #1 | 36.9 | 21.3 | 69.3 | 21.4 | Sodium Silicate | 1.0 | | | |
| | | Slimes #2 | 15.9 | 37.8 | 45.0 | 16.4 | | | | | |
| | | Slimes #3 | 9.9 | 40.6 | 41.5 | 11.0 | | | | | |
| | | Composite Head | 100.0 | 36.7 | 47.1 | 100.0 | | | | | |
| 4 | A | Concentrate | 40.1 | 62.8 | 7.2 | 69.6 | NaOH | | | 4.0 | −325 mesh. |
| | | Middling 1 | 13.8 | 47.6 | | 18.3 | CaCl₂·2H₂O | | | 1.0 | |
| | | Middling 2 | 7.8 | 27.3 | | 5.9 | Tapioca Flour | | | 1.5 | |
| | | Middling 3 | 6.4 | 14.2 | | 2.5 | Fatty acid | | | 1.0 | |
| | | Tailing | 31.9 | 4.3 | | 3.7 | | | | | |
| | | Composite Head | 100.0 | 36.1 | | 100.0 | | | | | |

TABLE 1.—Continued

| Ex. | Ore | Product | Wt.-percent | Analysis, percent | | Distribution percent Fe | Type | Reagents, Amount, lb./T. | | | Grind |
| --- | --- | --- | --- | --- | --- | --- | --- | --- | --- | --- | --- |
| | | | | Fe | SiO$_2$ | | | Desliming | Selective Flocculation and Desliming | Flotation | |
| 5 | A | Concentrate | 41.3 | 64.6 | 6.1 | 73.6 | NaOH | | 2.0 | 3.0 | −325 mesh. |
| | | Middling 1 | 10.3 | 51.9 | | 14.8 | Sodium Silicate | | 1.0 | | |
| | | Middling 2 | 4.4 | 29.2 | | 3.5 | CaCl$_2$.2H$_2$O | | 0.5 | 1.0 | |
| | | Tailing | 17.5 | 8.9 | | 4.3 | Tapioca Flour | | 0.5 | 1.25 | |
| | | Slimes #1 | 16.9 | 6.1 | | 2.8 | Fatty acid | | | 1.0 | |
| | | Slimes #2 | 5.2 | 3.0 | | 0.4 | | | | | |
| | | Slimes #3 | 4.4 | 4.2 | | 0.6 | | | | | |
| | | Composite Head | 100.0 | 36.3 | | 100.0 | | | | | |
| 6 | B | Deslimed Sand | 65.6 | 31.9 | 50.6 | 68.5 | NaOH | 2.0 | | | 88% minus 400-mesh. |
| | | Slimes #1 | 33.5 | 28.2 | 53.3 | 30.9 | Sodium Silicate | 1.0 | | | |
| | | Slimes #2 | 0.9 | 20.6 | 59.6 | 0.6 | | | | | |
| | | Composite Head | 100.0 | 30.6 | 51.6 | 100.0 | | | | | |
| 7 | B | Concentrate | 27.6 | 59.8 | 6.5 | 52.5 | NaOH | | | 4.0 | 88% minus 400-mesh. |
| | | Middling 1 | 14.0 | 52.6 | | 23.4 | CaCl$_2$.2H$_2$O | | | 2.0 | |
| | | Middling 2 | 8.8 | 39.5 | | 11.0 | Tapioca Flour | | | 2.0 | |
| | | Tailing | 49.6 | 8.3 | | 13.1 | Fatty acid | | | 2.0 | |
| | | Composite Head | 100.0 | 31.5 | | 100.0 | | | | | |
| 8 | B | Concentrate | 32.9 | 60.3 | 5.9 | 63.1 | NaOH | | 2.0 | 3.0 | 88% minus 400-mesh. |
| | | Middling 1 | 10.5 | 47.6 | | 15.9 | Sodium Silicate | | 1.0 | | |
| | | Middling 2 | 6.0 | 26.0 | | 5.0 | CaCl$_2$.2H$_2$O | | 1.5 | 1.0 | |
| | | Tailing | 35.0 | 4.5 | | 5.0 | Tapioca Flour | | 0.5 | 1.5 | |
| | | Slime | 15.6 | 22.2 | 62.9 | 11.0 | Fatty acid | | | 1.0 | |
| | | Composite Head | 100.0 | 31.5 | | 100.0 | | | | | |
| 9 | B | Concentrate | 31.8 | 60.8 | 5.3 | 62.4 | NaOH | | 2.0 | 3.0 | 88% minus 400-mesh. |
| | | Middling 1 | 9.7 | 49.8 | | 15.6 | Sodium Silicate | | 1.0 | | |
| | | Middling 2 | 5.3 | 26.7 | | 4.6 | Potato Starch | | 1.0 | | |
| | | Tailing | 31.5 | 5.2 | | 5.3 | CaCl$_2$.2H$_2$O | | 0.5 | 1.0 | |
| | | Slimes #1 | 16.5 | 20.8 | 64.5 | 11.1 | Tapioca Flour | | 0.5 | 1.25 | |
| | | Slimes #2 | 5.2 | 5.8 | 88.4 | 1.0 | Fatty acid | | | 1.0 | |
| | | Composite Head | 100.0 | | | 100.0 | | | | | |
| 10 | B | Concentrate | 30.7 | 60.6 | 5.3 | 60.1 | NaOH | | 2.0 | 3.0 | 88% 400-mesh. |
| | | Middling 1 | 11.1 | 48.8 | | 17.5 | Marasperse C | | 0.25 | | |
| | | Middling 2 | 6.1 | 26.7 | | 5.3 | Potato Starch | | 1.0 | | |
| | | Tailing | 32.0 | 4.7 | | 4.8 | CaCl$_2$.2H$_2$O | | | 1.0 | |
| | | Slimes | 20.1 | 19.0 | 67.7 | 12.3 | Tapioca Flour | | 0.5 | 1.0 | |
| | | Composite Head | 100.0 | | | 100.0 | Fatty acid | | | 1.0 | |
| 11 | A | Concentrate | 35.4 | 65.4 | 6.1 | 64.8 | NaOH | | 2.0 | | −325 mesh. |
| | | Middling 1 | 10.8 | 56.0 | | 16.7 | Sodium Silicate | | 1.0 | | |
| | | Middling 2 | 5.6 | 38.4 | | 6.0 | CaCl$_2$.2H$_2$O | | 0.5 | | |
| | | Tailing | 15.2 | 14.7 | | 6.2 | Tapioca Flour | | 0.5 | 0.75 | |
| | | Slimes #1 | 29.0 | 7.1 | 87.7 | 5.8 | Armac C | | | 0.25 | |
| | | Slimes #2 | 3.6 | 5.5 | 89.6 | 0.5 | Frother | | | 0.08 | |
| | | Composite Head | 100.0 | 36.1 | | 100.0 | | | | | |
| 12 | C | Deslimed Sand | 57.6 | 46.1 | | 73.6 | NaOH | 2.0 | | | 96% minus 400-mesh. |
| | | Slimes | 42.4 | 22.5 | | 26.4 | Sodium Silicate | 3.0 | | | |
| | | Composite Head | 100.0 | 36.1 | | 100.0 | | | | | |
| 13 | C | Concentrate | 29.2 | 64.2 | 4.6 | 52.1 | NaOH | | | 4.0 | 96% minus 400-mesh. |
| | | Middling 1 | 14.3 | 59.1 | | 23.5 | Tapioca Flour | | | 1.5 | |
| | | Middling 2 | 7.8 | 47.7 | | 10.3 | CaCl$_2$.2H$_2$O | | | 0.5 | |
| | | Tailing | 48.7 | 10.4 | | 14.1 | Fatty acid | | | 1.0 | |
| | | Composite | 100.0 | 36.0 | | 100.0 | | | | | |

TABLE 2

| Ore Designation | Chemical Analysis, percent | | Mineralogical Description |
| --- | --- | --- | --- |
| | Fe | SiO$_2$ | |
| A | 36.0 | 47.3 | Contains chiefly hematite and quartz, with a relative abundance of magnetite. Goethite is almost completely absent. Average hematite-magnetite aggregates 50 to 100 microns in size, but contain silica inclusions. Hematite-magnetite contains lattice-like silica intergrowths 2 to 4 microns wide. Silica contains disseminated iron oxide. |
| B | 30.2 | 51.8 | Goethite chief iron mineral, but also contains smaller amounts of hematite and magnetite. Quartz and chert present as gangue. Goethite occurs as massive grains with quartz intergrowths, and mixtures with hematite-magnetite and silica—including finely disseminated assemblages. In addition to quartz, about ½ volume is chert with finely disseminated hematite of less than 10 microns to less than 1 micron in size. |
| C | 36.1 | 47.1 | Contains chiefly hematite and quartz, with residual magnetite and minor amounts of goethite. Most of hematite ranges from 40 to 150 microns in size, with simple types of locking. Minus 40-micron hematite shows more complex types of locking. |

TABLE 3
[Continuous Circuit Flotation Results: Ore C[1] without Selective Flocculation]

| Product | Weight, percent | Analysis, percent | | Distribution, percent Fe | Reagents | | |
|---|---|---|---|---|---|---|---|
| | | | | | Type | Total amount, lb./long ton of— | |
| | | Fe | SiO₂ | | | Feed | Concentrate |
| Concentrate | 42.9 | 63.9 | 6.6 | 75.0 | NaOH | 4.07 | 9.50 |
| Tailing | 53.5 | 14.7 | | 21.5 | Calcium chloride | 1.17 | 2.72 |
| Thickener 1 Overflow | 3.6 | 35.4 | | 3.5 | Tapioca flour | 1.45 | 3.39 |
| Composite, Tailing and Thickener 1 Overflow | 57.1 | 16.0 | | 25.0 | Tall oil fatty acid | 2.62 | 6.11 |
| Composite, Head Sample | 100.0 | 36.5 | | 100.0 | | | |

[1] Nominal grind, 95 percent minus 400-mesh.

Sub-sieve Analysis of products:

| | Avg. particle dia., microns | Specific surface, cm.²/gm. |
|---|---|---|
| Cyclone overflow | 4.7 | 3,800 |
| Thickener overflow | 1.7 | 11,900 |
| Thickener underflow | 5.6 | 3,200 |
| Concentrate | 2.5 | 4,900 |
| Tailing | 5.9 | 3,200 |

TABLE 4
[Continuous Circuit Flotation Results: Ore C With Selective Flocculation at 10 Percent Solids [1]]

| Product | Weight, percent | Analysis, percent | | Distribution, percent Fe | Reagents | | |
|---|---|---|---|---|---|---|---|
| | | | | | Type | Total amount, lb./long ton of— | |
| | | Fe | SiO₂ | | | Feed | Concentrate |
| Concentrate | 46.5 | 65.1 | 4.8 | 83.7 | NaOH | 4.15 | 8.92 |
| Tailing | 43.0 | 9.9 | | 11.8 | Sodium Silicate | 2.07 | 4.46 |
| Thickener 1 Overflow | 10.5 | 15.4 | | 4.5 | Calcium chloride | 0.88 | 1.90 |
| Composite, Tailing and Thickener 1 Overflow | 53.5 | 11.0 | | 16.3 | Tapioca flour | 1.29 | 2.78 |
| Composite, Head Sample | 100.0 | 36.2 | | 100.0 | Tall oil fatty acid | 1.24 | 2.67 |

[1] Grind, 93 percent minus 400-mesh.

What is claimed is:

1. A process for concentration of iron ores comprising the following sequence of steps (1) initially forming a relatively stable aqueous dispersion of the ore, (2) treating the dispersion of ore with a flocculating agent capable of causing selective flocculation of the iron oxides in the ore in preference to silica materials, and selected from the group consisting of starches, flours, and polyacrylamides (3) allowing the flocculated iron oxides to settle, (4) separating and removing the suspended silica materials from the flocculated iron oxides and (5) subsequently subjecting an aqueous pulp of the flocculated iron oxides to a froth flotation operation in the presence of a collecor to further separate iron oxides from siliceous materials.

2. The method of claim 1 in which the initial aqueous dispersion of the ore is achieved by use of a dispersing agent comprising a combination of NaOH and sodium silicate.

3. The method of claim 1 in which the flocculating agent employed to effect the selective flocculation is tapioca flour.

4. The method of claim 3 in which calcium chloride is additionally added to improve selective flocculation.

5. The method of claim 1 in which the suspended silica materials are separated from the flocculated iron oxides by decantation.

6. The method of claim 1 in which the suspended silica materials are separated from the flocculated iron oxides by overflowing.

7. The method of claim 1 in which the suspended silica materials are separated from the flocculated iron oxides by siphoning.

8. The method of claim 1 in which the flocculated iron oxides are conditioned with tapioca flour, NaOH and calcium chloride prior to flotation.

9. The method of claim 1 in which the collector for the siliceous materials in the flotation operation is an anionic reagent.

10. The method of claim 1 in which the collector for the siliceous materials in the flotation operation is a cationic reagent.

References Cited by the Examiner

UNITED STATES PATENTS

| | | | |
|---|---|---|---|
| 2,149,748 | 3/1939 | Samuel | 209—5 X |
| 2,217,684 | 10/1940 | Kirby | 209—166 |
| 2,322,201 | 6/1943 | Jayne | 209—166 |
| 2,381,514 | 8/1945 | Phelps | 209—5 |
| 2,383,467 | 8/1945 | Clemmer | 209—166 |
| 2,660,303 | 11/1953 | Haseman | 209—5 |
| 2,740,522 | 4/1956 | Aimone | 209—166 |

OTHER REFERENCES

Melcher et al., Mining Congress Journal, vol. 49, p. 29, December 1963.

HARRY B. THORNTON, *Primary Examiner.*

ROBERT HALPER, *Assistant Examiner.*